United States Patent [19]
McConnell et al.

[11] 3,803,901
[45] Apr. 16, 1974

[54] PIPE TESTER
[75] Inventors: William M. McConnell, Pittsburgh;
William H. Bradley, Ben Avon;
Howard E. Chappell, Butler;
Raymond L. Carey, Pittsburgh, all of Pa.
[73] Assignee: Taylor-Wilson Manufacturing Company, McKees Rocks, Pa.
[22] Filed: Oct. 10, 1972
[21] Appl. No.: 296,286

[52] U.S. Cl. .................................. 73/49.8, 138/90
[51] Int. Cl. ............................................ G01m 3/28
[58] Field of Search ............ 73/49.8, 46, 49.1, 49.5; 138/90

[56] References Cited
UNITED STATES PATENTS
2,155,602  4/1939  Keulers ................................. 138/90
2,663,183  12/1953  Huhn ..................................... 73/46

Primary Examiner—Richard C. Queisser
Assistant Examiner—Joseph W. Roskos
Attorney, Agent, or Firm—Webb, Burden, Robinson & Webb

[57] ABSTRACT

The pipe tester head is adapted to seal on the interior surface of a pipe slightly inward of the pipe coupling and on the exterior surface of the pipe coupling. The main housing includes a central chamber partly defined by the annular seal which engages the pipe coupling. An elongated rod extends through the central chamber and out of the main housing and has the annular seal which engages the pipe interior positioned thereabout. The pipe to be tested slides over the pipe seal and into the central chamber. The pipe tester head includes a plurality of purge lines, a test fluid inlet and an interchangeable inner assembly to accommodate different size pipe.

16 Claims, 1 Drawing Figure

PATENTED APR 16 1974
3,803,901
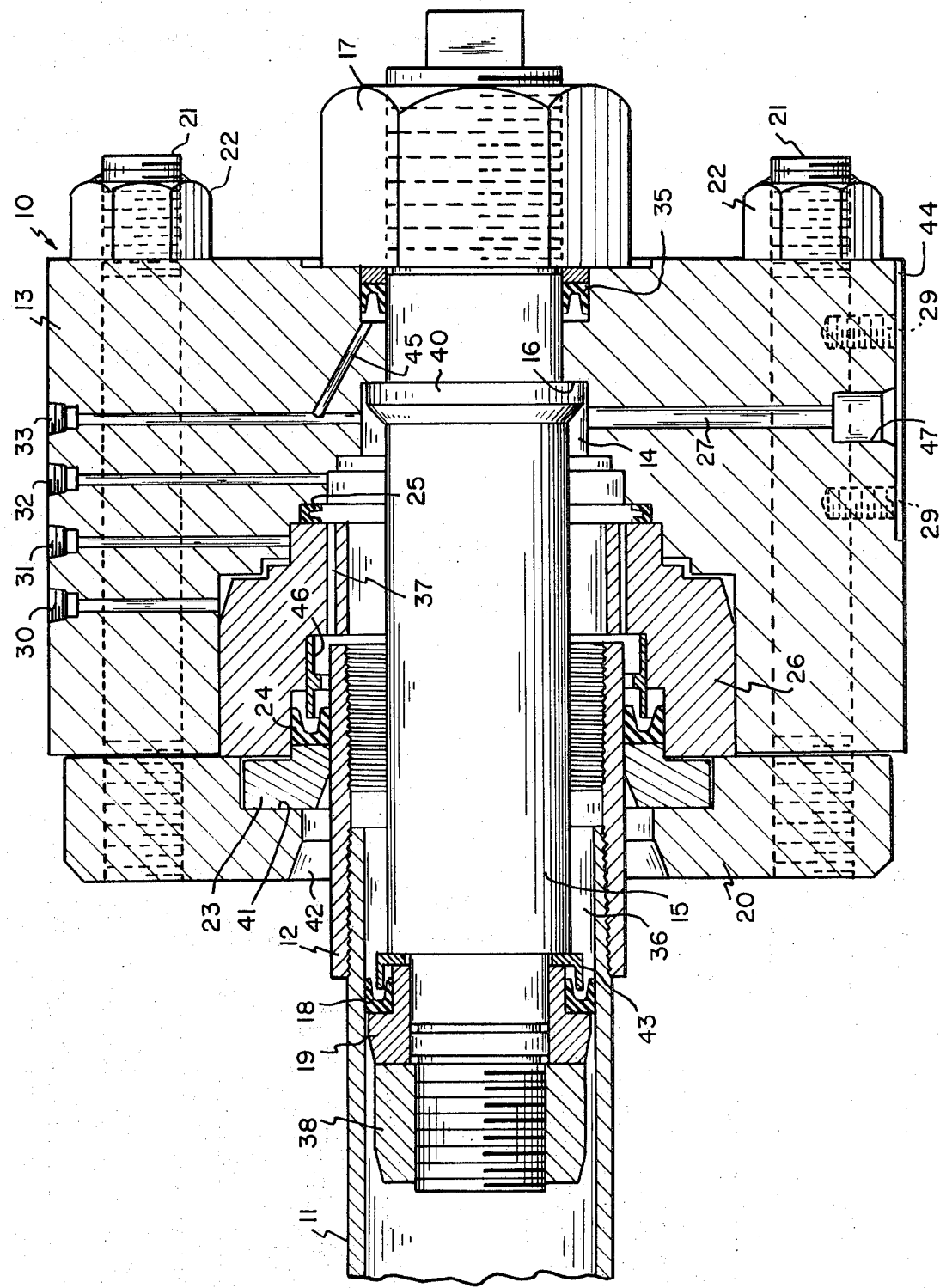

PIPE TESTER

BACKGROUND OF THE INVENTION

Our invention relates to pipe testing equipment and, more particularly, to a pipe tester head which permits testing of a pipe joint at the pipe coupling only.

Pipe lengths are normally field tested by plugging off both the coupling end and the free end and completely filling the pipe with a test fluid such as water to the desired pressure. This practice has the inherent drawbacks of being time consuming and costly in that entire lengths of pipe must be filled with the testing fluid and, of course, the entire length of pipe must be purged of air prior to testing to assure accurate results. Similar field testing is also conducted at the place of manufacture since the manufacturer must assure the soundness of the joint between the coupling and the pipe. Because of the grave consequences of having an in-use leakage at the joint, several tests are conducted prior to and after installation of the pipe. Testing is often conducted on installed pipe by inserting portable testing heads having collapsible seals to engage the interior of the pipe on either side of the coupling.

SUMMARY OF THE INVENTION

Our invention permits the field testing of pipe and the testing of pipe at the place of manufacture without having to fill the complete pipe with the testing fluid. By isolating the area at and immediately adjacent to the coupling, purging is greatly simplified and testing time is greatly reduced. Because of these advantages, total testing time prior to installation is substantially reduced. Further, since field testing can be easily conducted at the site of installation, the total number of tests prior to installation can be reduced since the positive seals on the interior of the pipe and the exterior of the coupling provide reproducible and reliable test results which are readily obtainable.

Our invention is a pipe tester which includes a main housing and a rod connected thereto and extending out of an opening therein so as to form an annular chamber between the housing and the rod. A first annular seal is positioned about the rod so as to engage the interior of the pipe and a second annular seal is retained within the housing about the annular chamber to seal on the exterior of the coupling. A plurality of purge lines and a test fluid inlet extend through the housing. A housing inner assembly which is retained in place by a retaining plate is interchangeable to accommodate different size pipe.

BRIEF DESCRIPTION OF THE DRAWING

The sole FIGURE is a section through the pipe tester head.

DESCRIPTION OF THE PREFERRED EMBODIMENT

The pipe tester head, generally designated 10, is normally mounted to a support structure, not shown, which includes an entry conveyor and grippers for holding the pipe 11 with its threaded coupling 12 firmly in position during testing. The pipe tester head 10 includes a main housing 13 having a central opening 14 extending therethrough, the sole FIGURE. The central opening 14 is defined along the interior surface of the rear wall of main housing 13 by a shoulder 16. Elongated rod 15 extends through and out of central opening 14 and includes a rearward flange portion 40 which abuts shoulder 16. The rearward end of rod 15 is threaded and a large hex nut 17 retains the rod 15 in place within the main housing 13. An annular seal 35 surrounds the rearward end of rod 15 and is positioned in a recess in the rear surface of main housing 13.

The interior of main housing 13 which defines central opening 14 is of an annular stepped wall construction. Four purge ducts 30, 31, 32 and 33 extend through the main housing 13 and cooperate with the central opening 14. Each purge duct includes a threaded recess at its inlet end and terminates at a particular stepped wall. The longest purge duct 33 terminates adjacent the flange portion 40 of the rod 15. A channel 45 extends between purge duct 33 and the recess in the rear surface of main housing 13 which accommodates the annular seal 35. This creates a high pressure seal between the rod 15 and the rear wall of main housing 13.

A large retaining plate 20 is bolted to the forward end of main housing 13 by means of threaded rods 21 which extend through the housing and threadably engage the retainer plate 20 at one end and which are held in place by means of hex nuts 22 which threadably engage the other end of rod 21. Retaining plate 20 is annular and the opening 42 is frustoconically shaped at its forward end. Retaining plate 20 also includes a shoulder portion 41 which is adjacent the central opening 14 of the main housing 13. An annular seal plate 23 is retained in the shoulder 41 of retaining plate 20 and extends slightly inward of the central opening 14.

A stepped block 26 matingly engages certain of the stepped walls of the main housing 13 to permit certain of the purge line ducts 32 and 33 to cooperate with the central opening 14. The remaining purge line ducts 30 and 31 are sealed off from use by means of an annular seal 25 positioned between the terminal portion of block 26 and a stepped wall portion of main housing 13. The seal plate 23 and block 26 cooperate with annular seal 24 to define the desired central opening diameter for the coupling 12. Seal 24 is further maintained in proper location by annular spacer ring 46 positioned adjacent the block 26. Stepped block 26 includes a plurality of orifices 37 which extend through the block 26 in the area of the block's inward most portion. These orifices 37 permit the passage of test fluid to assure a constant pressure throughout.

The distal end of rod 15 is threaded and engages nut 38 which retains an annular seal plate 19 in place between the recessed forward portion of seal plate 19 and an annular flange member 43 positioned about the distal end of rod 15. Annular seal 18 is positioned in the recessed forward portion of seal plate 19 and is held in place by annular flange member 43 which is retained against a shouldered section of rod 15. Annular seal 18 is of the necessary diameter to accommodate the interior of pipe 11 thereover.

A test fluid inlet assembly consists of a fluid passageway 27 extending through the main housing 13 to cooperate with central opening 14, a fluid inlet 47 cooperating with passageway 27, a gasket type seal 44 positioned about the fluid inlet 47 and bolt holes 29 to accommodate a test fluid carrier arrangement (not shown) which cooperates with the high pressure pump.

The operation of the pipe tester is as follows. The pipe 11 having a coupling 12 threaded at one end approaches the pipe tester 10 on a conveyor and is directed over the rod 15 until the outer surface of coupling 12 frictionally engages seal 24 so that a positive seal is formed on the exterior of the coupling 12. This movement is controlled by the stroke of the gripper (not shown). Seal 18 slidably engages the interior of pipe 11 during the pipe's entrance into the main housing 13 and after the pipe 11 and coupling 12 are in place, seal 18 is positively positioned on the pipe interior and slightly spaced from the coupling 12.

A test chamber 36 is formed by the pipe 11 and coupling 12 interior and the rear portion of central opening 14. This chamber 36 is purged of air through the purge lines 32 and 33 which cooperate with the opening 14. The test chamber is completely sealed by the respective seals 18, 24, 25 and 35. After the chamber 36 is purged, the test fluid is directed into chamber 36 through the fluid passageway 27. The desired fluid pressure is applied by pumps external of the test head and the coupled joint may be visually examined as well as any pressure drop noted.

The main housing 13 can accommodate different diameter pipe. To do so requires changing the rod assembly formed of the rod 15, the seal 18 and the various retaining means employed to maintain the seal in place. In addition, the inner assembly formed of the seal plate 23 and seal block 26 is changed by removing plate 20 and replacing the inner assembly with one which forms the desired inner diameter to accommodate a new coupling size.

We claim:

1. A pipe tester head for testing pipe length threaded to a coupling comprising:
   A. a main housing having an opening therethrough;
   B. a rod having a first shouldered portion and connected to the housing and extending through and out of the opening to form a chamber between the rod and the housing;
   C. a recessed annular seal plate secured against said first shouldered portion;
   D. first annular seal means mounted about the rod external of the opening and cooperating with the seal plate recess to sealably engage the interior surface of a pipe slightly spaced from the coupling;
   E. second annular seal means retained within the chamber to sealably engage the exterior surface of the coupling;
   F. fluid inlet means cooperating with the chamber to provide fluid thereto; and
   G. purge means cooperating with the chamber to permit purging thereof.

2. The pipe tester of claim 1, said first annular seal means positioned between said seal plate and an annular flange member positioned against a second shouldered portion of the rod.

3. A pipe tester head for testing pipe length threaded to a coupling comprising:
   A. a main housing having an opening therethrough;
   B. an inner assembly positioned within the opening;
   C. an apertured outer plate connected to the housing for retaining the inner assembly in place;
   D. a rod connected to the housing and extending through and out of the opening and outer plate to form a chamber defined by the rod, the inner assembly and the housing;
   E. first annular seal means mounted about the rod external of the opening to sealably engage the interior surface of a pipe slightly spaced from the coupling;
   F. second annular seal means retained within the chamber to sealably engage the exterior surface of the coupling;
   G. fluid inlet means cooperating with the chamber to provide fluid thereto; and
   H. purge means cooperating with the chamber to permit purging thereof.

4. The pipe tester of claim 3 wherein said purge means includes a plurality of parallel and spaced purge ducts.

5. The pipe tester head of claim 3, said opening being partly defined by a shouldered rear section of the main housing, said rod including a flange portion abutting said shouldered rear section.

6. The pipe tester head of claim 5 wherein the opening in the main housing is partly defined by a stepped wall construction with said purge ducts extending through certain of the stepped walls, respectively.

7. The pipe tester head of claim 6 wherein said inner assembly includes a multi-shouldered insert member adapted to cooperate with certain of the stepped walls to close off certain of said purge means.

8. The pipe tester head of claim 7 including a seal retaining member positioned adjacent the second annular seal means and cooperating with a shoulder of the outer plate and the insert member to retain the second annular seal means in place.

9. The pipe tester of claim 7 including a third seal means positioned between an inner end of the insert member and an adjacent stepped wall.

10. The pipe tester head of claim 5, said rod being connected to said housing by nut means threadably engaging the rod to retain the flange portion thereof against the shouldered rear section of the main housing.

11. The pipe tester head of claim 10 including fourth seal means about the rod positioned substantially adjacent the nut means.

12. The pipe tester of claim 11 wherein said fourth seal means are positioned within a recess formed in the rear section of the main housing.

13. The pipe tester of claim 12 wherein a channel extends between said recess and one of said purge ducts.

14. The pipe tester head of claim 7 wherein the multi-shouldered insert member includes a plurality of orifices extending therethrough in the area of the inward portion.

15. The pipe tester head of claim 7 wherein said inner assembly includes an annular seal plate positioned within a recess in the outer plate and extending within the opening to engage the second annular seal means.

16. The pipe testerhead of claim 15 including an annular spacer ring positioned adjacent the insert member to retain the second annular seal means in position.

* * * * *